(No Model.) 4 Sheets—Sheet 1.

J. B. A. SIMONNET.
PROCESS OF EXTRACTING GOLD OR SILVER BY CHLORINATION.

Figure 1:
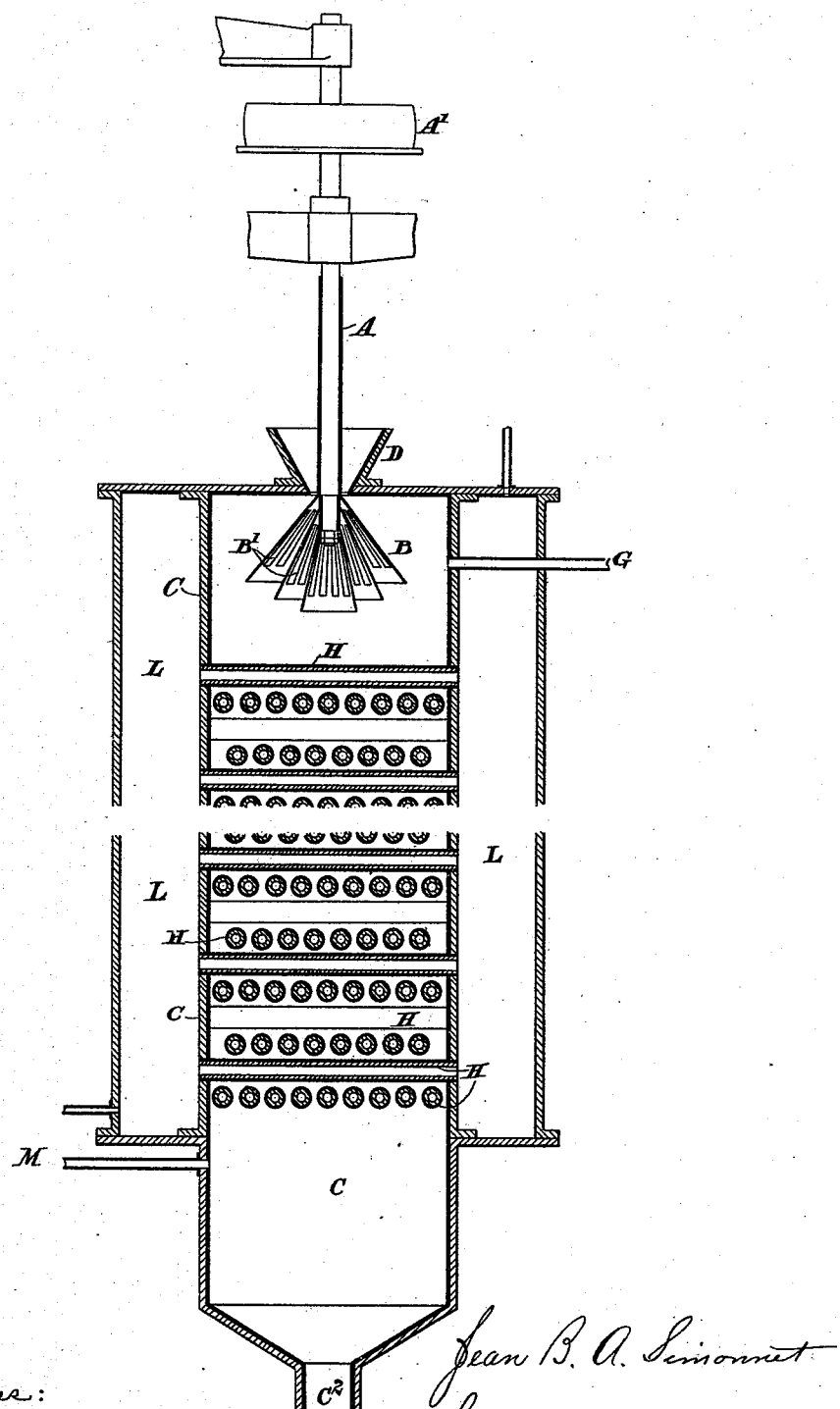

No. 413,686. Fig. 1. Patented Oct. 29, 1889.

Witnesses:
J. Hagmann
C. J. Hedrick

Jean B. A. Simonnet
by A. Pollok
his attorney (No Model.) 4 Sheets—Sheet 2.

J. B. A. SIMONNET.
PROCESS OF EXTRACTING GOLD OR SILVER BY CHLORINATION.

No. 413,686. Patented Oct. 29, 1889.

(No Model.)
4 Sheets—Sheet 3.
J. B. A. SIMONNET.
PROCESS OF EXTRACTING GOLD OR SILVER BY CHLORINATION.
No. 413,686. Patented Oct. 29, 1889.
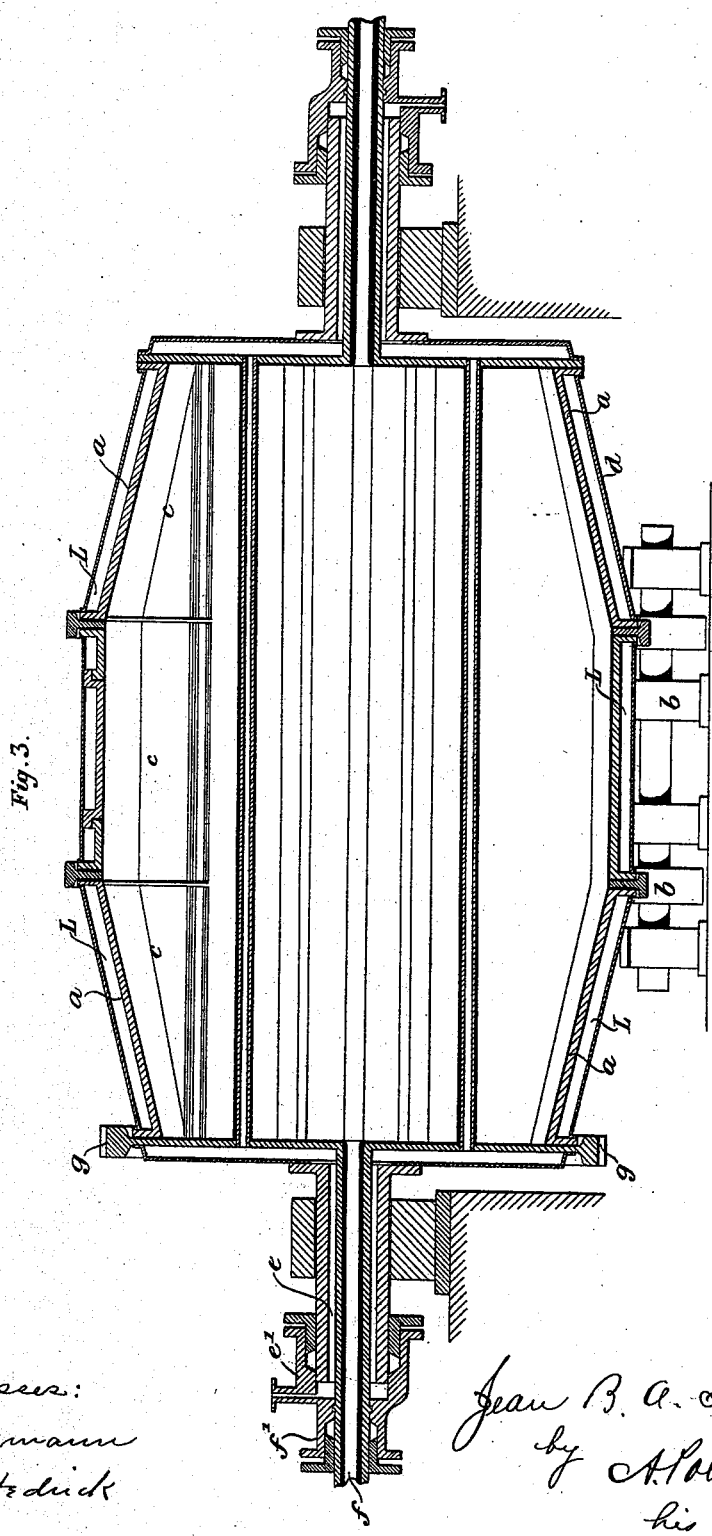
Witnesses:
J. Hogmann
C. J. Hedrick
Jean B. A. Simonnet
by A. Pollok
his attorney (No Model.) 4 Sheets—Sheet 4.
J. B. A. SIMONNET.
PROCESS OF EXTRACTING GOLD OR SILVER BY CHLORINATION.
No. 413,686. Patented Oct. 29, 1889.
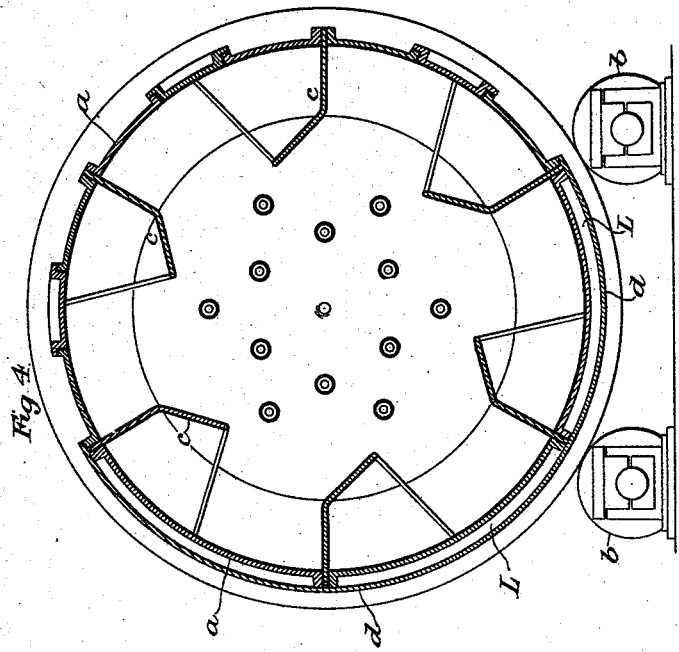

UNITED STATES PATENT OFFICE.

JEAN BAPTISTE AMABLE SIMONNET, OF CLERMONT-FERRAND, FRANCE, ASSIGNOR TO SAMUEL WILKINS CRAGG, OF BALTIMORE, MARYLAND.

PROCESS OF EXTRACTING GOLD OR SILVER BY CHLORINATION.

SPECIFICATION forming part of Letters Patent No. 413,686, dated October 29, 1889.

Application filed June 27, 1889. Serial No. 315,774. (No model.) Patented in England April 9, 1889, No. 6,116.

*To all whom it may concern:*

Be it known that I, JEAN BAPTISTE AMABLE SIMONNET, mining engineer, a citizen of the French Republic, residing at Clermont-Ferrand, in the Republic of France, have invented certain Improvements in the Process of Extracting Gold or Silver by Chlorination from their Ores or other Matters Containing Gold or Silver, or both, (for which I have applied for a patent in Great Britain, No. 6,116, dated April 9, 1889,) of which the following is a specification.

This invention has for its object to provide means whereby the extraction of gold or silver or of gold and silver from their ores or from materials containing gold or silver, or both, is effected in a more ready, economical, and rapid manner than hitherto, and without the necessity for amalgamation.

According to this invention the ores or materials containing gold or silver, or both, are ground or reduced, and then they are sifted, so as to separate the fine dust from the granules or larger particles. This separation of the fine dust is effected because it is found advantageous to treat the coarser particles or granules and the finer portions or dust separately from each other, as the finer portions require less time to roast and to chlorinate, but a longer time for washing out the chlorides, than do the coarser particles or granules. Otherwise the treatment for both grades is the same, and the following description will therefore serve to show how each is to be treated. The finely-divided material is then roasted, and is subsequently chlorinated with dry gaseous chlorine, the roasted material being during chlorination in a dry heated condition and the process of chlorination being carried on while the temperature is maintained at from 100° to 140° centigrade, and while the divided material is showered down or caused to fall through or is agitated in an atmosphere of chlorine gas admitted so as to pass in a direction the contrary of the direction taken by the divided material under treatment. The chlorine may be caused to pass from one vessel to another, and chlorine may be recovered from the chlorinating-chambers by passing the escaping chlorine over slaked lime or a soda solution after being reduced to a cold state, and the chlorine be thus obtained for further use. After chlorination is effected any remaining chlorine can be disengaged by passing a current of air or of carbonic-acid gas through the apparatus.

The casing or main body of the apparatus for chlorinating by causing the divided matter to be treated to fall or pass through the chlorine gas it is preferred to make of cast-iron, with the parts in contact with the gas lined or covered with lead. The apparatus is preferably disposed vertically, and is provided with deflectors or perforated funnels and horizontal bars or tubes beneath for disseminating the divided material under treatment, or with rotating plates or disks and inclined sides for spreading it, or a revolving drum or cylinder horizontally disposed may be used, it being provided in its interior with shelves, troughs, or buckets, which elevate and shower down the divided material under treatment by the gaseous chlorine, and there may be bars for disseminating the materials under treatment. There is provided in connection with the apparatus means for heating to the temperature aforesaid and for maintaining during the process the temperature of the divided matter under treatment and the gaseous chlorine by which it is being treated, and there are also provided suitable inlets and outlets for the materials and for the gaseous chlorine. There may be, for the purpose of heating and maintaining the temperature and putting under ready control for regulation, a jacket around the apparatus, into which steam or hot air or gas is passed. The discharging of the divided material after treatment can be effected or assisted by a current of air or by means of a partial vacuum.

In this process, owing to the temperature employed, the base metals or their oxides remain inert or do not absorb chlorine, so that a great economy in chlorine is effected. With simple ores the chlorination is very rapidly completed, usually in a few seconds, and the ore or material is left in such a dry, heated, and finely-divided state that the lixiviation or washing out of the chlorides of gold and silver can be conducted with great rapidity, economy, and at any desired temperature.

In order by one lixiviation or washing to extract both the gold and silver, it is preferred to use as solvents for the chlorides and perchlorides produced solutions of either cyanide of potassium, cuprocyanide of potassium, or hyposulphite of lime or soda; or in cases where silver is not contained in the materials under treatment alchohol may be used as a solvent for the perchloride of gold. In using the cyanides it is an advantage to add a small quantity of alkaline carbonate. The lixiviation or washing is preferably done in wooden vessels coated with asphalt varnish and provided with false bottoms and cotton-cloth or other filters. Air pressure or suction may be employed to facilitate filtration. If alcoholic washing be employed, the vessels should be covered to prevent loss by evaporation. If cyanides be used, the vessels should also be covered. The chloride of gold is separated from the residue, which may be done in the usual way, and the residue be mixed with peroxide of manganese and treated with sulphuric acid, so that chlorine which may have been in excess is liberated and can be reused in the process. When hyposulphites have been used as solvents, the gold and silver can be precipitated by sulphide of calcium in quantity required for the purpose, and after filtration the clear liquid can be employed for lixiviating or washing a further quantity of materials. All the solutions which have been used in this process can be saved for reuse.

The accompanying drawings illustrate apparatus suited for use in carrying out the process according to this invention.

Figure 1 is a vertical section of one arrangement of apparatus suited for chlorinating the divided and roasted material according to this invention. This arrangement of apparatus is more especially suitable for treating ores in which the gold exists in a condition of perfect dissemination and the particles of metal are of such tenuity as to enable them to be converted by a very brief contact with the chlorine. This apparatus consists of a chamber or column C, provided with a vertical shaft A, arranged at the upper part of the said chamber or column C and receiving rotary motion from a pulley A′. The lower end of this shaft A carries a series of deflectors B, in the form of inverted funnels of square or other suitable form in plan, and provided with slots or perforations B′. Beneath these deflectors there is arranged a number of horizontal rows of tubular bars H, situated at right angles to each other and with the openings in one row over the solid parts of the row beneath, as shown in the drawings. The deflectors B and bars H are inclosed in the column or casing C, which is preferably constructed of cast-iron, and this casing C is inclosed in an outer casing K, so that there is between the two casing C and K a space L for the circulation of steam or other heating agent out of contact with the contents of the chamber or casing C. The pulverized and roasted ore in a perfectly dry condition, being at a temperature of from 100° to 140° centigrade, is supplied, preferably by hand or by means of any suitable feeding mechanism, into a hopper D above the deflectors B, and is caused by the action of these deflectors to fall in a shower through the chamber C, which is charged with an atmosphere of chlorine gas heated to from 100° to 140° centigrade and introduced through a pipe M at the lower part of the chamber C. The ore is further disseminated and retarded in its descent by the tubular bars H, and the gold and silver are effectually acted upon by the chlorine and converted into chlorides by the time the materials reach the bottom of the chamber C, which is made in the form of a funnel and is provided with an aperture $C^2$, through which the materials are removed after treatment. During the operation the temperature of the apparatus is maintained at from about 100° to 140° centigrade by means of steam or hot air or gas, which is caused to circulate in the space L between the casings C and K, and in the interior of the tubular bars H also, if desired. This apparatus is preferably constructed of iron, all the parts exposed to the action of the chlorine being lined or covered with lead, as shown by the thicker black lines. The chlorine in excess is drawn or passes off through a pipe G, and may be treated as hereinbefore described.

Figure 2:
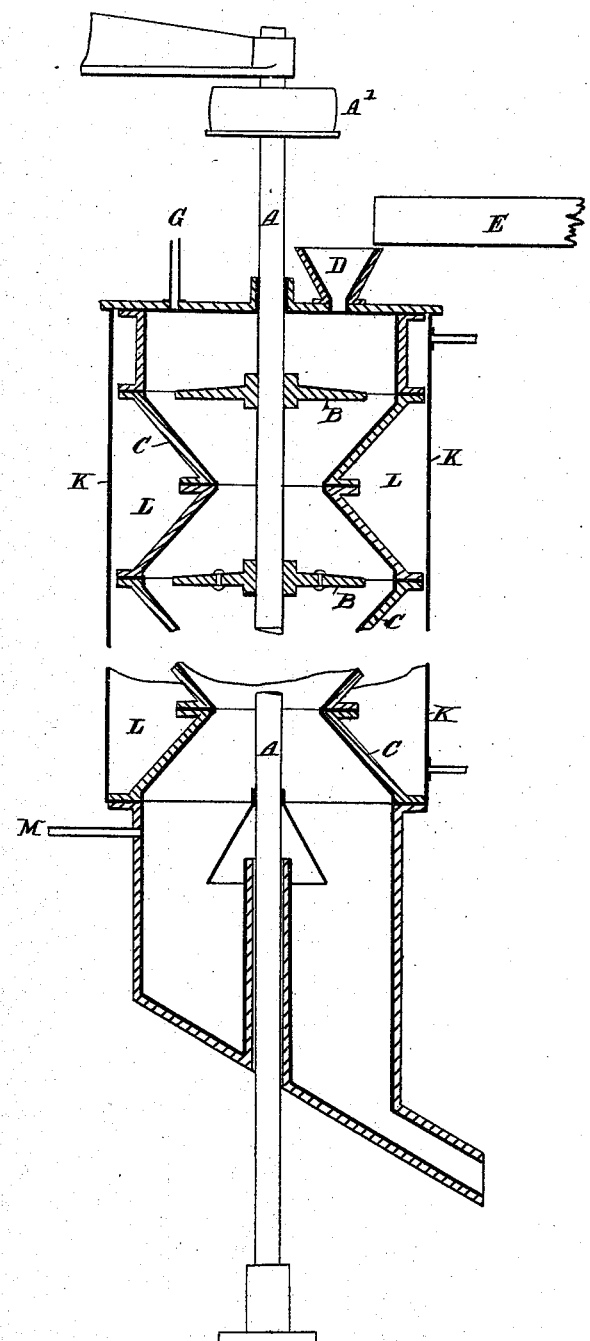

Fig. 2 of the accompanying drawings represents in vertical section an arrangement of the apparatus with circular rotating plates suitable for use in cases where the materials require to remain for a longer period in contact with the chlorine. This apparatus is constructed with a vertical shaft A, receiving rotary motion from a pulley A′ and carrying a suitable number of horizontal disks or plates B. These plates are contained in a casing C, built up in the form of a column, with a series of hollow truncated conical sections connected by horizontal flanges or otherwise. These sections are preferably of cast-iron, and can be readily disconnected, so as to facilitate the adjustment of the plates B. All the surfaces exposed to the contact of the materials are covered with lead, the lead lining of the casing being lapped over and secured between the flanges. The casing C is inclosed in an outer casing K, which enables the temperature of the apparatus to be maintained at 100° to 140° centigrade by means of steam, air, or gas circulating in the annular space L between the casings C and K. Above this apparatus there is a chute or trough E, which may be provided with a helix or creeper, which delivers the dry and heated ore to a hopper D on the casing C. The ore falls through this hopper onto the upper disk B, whence it is thrown onto the inclined side of the funnel-shaped or conical casing, which directs it onto the next rotating disk. The ore is thus caused to pass from one disk to another until it is discharged at the bottom of the column, and in its descent is effectually exposed to the action of the ascending current of heated chlorine, which is admitted through a pipe M at the lower part of the column. The excess of chlorine passes off or is drawn off by a pump through a pipe G.

An arrangement of the apparatus more especially adapted for use in the chlorination of refractory ores is illustrated in Figs. 3 and 4, which represent this apparatus in transverse and longitudinal section, respectively. The said apparatus is composed of a horizontal drum or cylinder $a$, preferably built up with cast-iron sections lined with lead and supported on rollers $b$, so as to be capable of rotating on a horizontal axis. Buckets or shelves $c$, also covered with lead, are arranged in the interior of the cylinder, being of such a form as when the cylinder rotates to carry up the ore nearly to the upper side of the cylinder. The cylinder is provided with a jacket or casing $d$, and is heated to the required temperature by means of steam (or hot air or gas) circulating in the annular space L between the casing $d$ and the cylinder $a$. The steam, air, or gas is admitted through a tube $e$, passing through a stuffing-box $e'$ at one end of the cylinder, and the heated chlorine is conducted to the interior of the cylinder through a pipe $f$, passing through a stuffing-box $f'$ and through the center of the steam-pipe $e$. A similar arrangement is provided at the other end of the cylinder for drawing or allowing to pass off the steam, air, or gas and the excess of chlorine, respectively. The water of condensation in the jacket (when steam is used) may be blown off along with the escaping steam or through cocks provided in the casing $d$. The cylinder $a$ being charged with a suitable quantity of dry and heated and reduced ore and caused to rotate on its axis by means of gearing acting on a toothed rim $g$, the ore is carried up by the buckets or shelves $c$, and then when the shelf is near the top of the cylinder falls in a shower through the atmosphere of chlorine gas. The chlorine admitted through the pipe $f$ is thus brought into intimate contact with the particles of reduced materials under treatment for the required length of time to effect chlorination. Any part of the ore that has a tendency to adhere or cake together is broken up by falling onto a series of bars or tubes $h$, arranged in the interior of the cylinder. If they be tubes, the steam, air, or gas may pass through them.

In all the arrangements the chlorine gas which passes off may be conducted to another chlorinating-chamber or be absorbed by slaked lime or the like.

Having now particularly described and ascertained the nature of my said invention and in what manner the same is to be performed, I declare that what I claim is—

1. In the process of extracting gold or silver or gold and silver from their ores or materials containing them, the improvement which consists in first roasting or oxidizing the ores or materials and then subjecting them in a dry state to the action of dry gaseous chlorine, the chlorination being effected at a temperature of from 100° to 140° centigrade, as set forth.

2. In extracting gold or silver or gold and silver from their ores or materials containing them, the process consisting in grinding or reducing the ores or materials to be treated and separating the finer portions or dust from the coarser portions or granules, roasting or oxidizing them separately, and subjecting such finer and coarser portions separately to the action of dry gaseous chlorine, the chlorination being conducted at a temperature of from 100° to 140° centigrade.

3. In the process of extracting gold or silver or gold and silver from their ores or materials containing them, the improvement consisting in subjecting said ores or materials in a dry state, after roasting or oxidizing, to the action of dry gaseous chlorine and maintaining the temperature at from 100° to 140° centigrade during chlorination by means of heated fluid—such as steam, air, or gas—surrounding the vessel in which the operation is carried on, as set forth.

4. In the process of separating gold or silver or gold and silver from their ores or materials containing the same, the improvement consisting in first roasting or oxidizing the reduced ores or materials and then showering the same in a dry condition through a chamber or column through which dry gaseous chlorine is passed in the opposite direction, the temperature being maintained during chlorination at from 100° to 140° centigrade, as set forth.

In testimony whereof I have signed my name to this specification in the presence of two subscribing witnesses.

JEAN BAPTISTE AMABLE SIMONNET.

Witnesses:
SAMUEL WILKINS CRAGG,
J. SLOPER,
    7 *Rue Scribe, Paris.*